United States Patent
Kim et al.

(10) Patent No.: US 7,929,397 B2
(45) Date of Patent: Apr. 19, 2011

(54) HOLOGRAPHIC STORAGE MEDIUM, AND METHOD AND APPARATUS FOR RECORDING/REPRODUCING DATA ON/FROM THE HOLOGRAPHIC STORAGE MEDIUM

(75) Inventors: Jin-han Kim, Suwon-si (KR); Hyun-soo Park, Seoul (KR); Sung-hoo Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 791 days.

(21) Appl. No.: 11/837,967

(22) Filed: Aug. 13, 2007

(65) Prior Publication Data

US 2008/0165604 A1    Jul. 10, 2008

(30) Foreign Application Priority Data

Jan. 5, 2007    (KR) .................. 10-2007-0001707

(51) Int. Cl.
*G11B 7/00*    (2006.01)
(52) U.S. Cl. .................................... 369/103
(58) Field of Classification Search .............. None
See application file for complete search history.

(56) References Cited

U.S. PATENT DOCUMENTS

| 2003/0043150 A1 | 3/2003 | Hwang |
| 2007/0047042 A1* | 3/2007 | Noguchi ............... 359/24 |
| 2007/0086074 A1* | 4/2007 | Thies .................. 359/21 |
| 2007/0147214 A1* | 6/2007 | Erben et al. ........... 369/103 |
| 2008/0247010 A1 | 10/2008 | Ogasawara et al. |
| 2008/0254262 A1* | 10/2008 | Hirao et al. ........... 428/167 |

FOREIGN PATENT DOCUMENTS

| JP | 2005-251241 | 9/2005 |
| JP | 2006-259519 | 9/2006 |
| KR | 2005-59666 | 6/2005 |
| KR | 2006-61671 | 6/2006 |
| WO | WO 2005/006317 | 1/2005 |
| WO | WO 2006/098419 | 9/2006 |

OTHER PUBLICATIONS

Search Report issued in PCT International Application No. PCT/KR2007/005067 on Jan. 14, 2008.
European Search Report issued on Jan. 7, 2010, in corresponding European Application No. 07833376.2 (3 pages).

* cited by examiner

*Primary Examiner* — Daniell L Negrón
*Assistant Examiner* — Henok Heyi
(74) *Attorney, Agent, or Firm* — NSIP Law

(57) ABSTRACT

A holographic storage medium, and a method and an apparatus for recording/reproducing data on/from the holographic storage medium. The method including: dividing a datapage into a plurality of regions; modulating the data into codewords having different on-pixel rates; and arranging the codewords in the plurality of regions, based on the different on-pixel rates.

27 Claims, 5 Drawing Sheets

DATAPAGE

3:8 MODULATION CODE

6:8 MODULATION CODE

HOLOGRAPHIC STORAGE MEDIUM, AND METHOD AND APPARATUS FOR RECORDING/REPRODUCING DATA ON/FROM THE HOLOGRAPHIC STORAGE MEDIUM

CROSS-REFERENCE TO RELATED APPLICATION

This application claims all benefits accruing under 35 U.S.C. §119 from Korean Patent Application No. 2007-1707, filed on Jan. 5, 2007, in the Korean Intellectual Property Office, the disclosure of which is incorporated herein, by reference.

BACKGROUND OF THE INVENTION

1. Field of the Invention

The present invention relates to a holographic storage medium, and a method and an apparatus for recording/reproducing data on/from the holographic storage medium.

2. Description of the Related Art

In optical holography, data is stored in the volume, not the surface, of a recording medium. Holograms are recorded using a signal beam and a reference beam. The signal beam interferes with the reference beam in the recording medium, to generate an interference pattern, which is referred to as a datapage. Multiple patterns can be superimposed, by changing the optical characteristics of the reference beam. This process is referred to as "multiplexing." When reading data, a single reference beam is incident on the recording medium, under the same conditions as in data recording, to generate a diffraction beam, which displays stored data in a page (datapage). The diffraction beam is detected by a detection array. The detection array extracts stored data bits, by measuring intensity patterns. The datapage includes a large number of data bits or pixels. Data storage capacity can be increased, by superimposing additional datapages in the same volume of the recording medium.

FIGS. 1A and 1B illustrate the recording and reproducing of data in optical holography. Referring to FIG. 1A, when recording data, a reference beam R and a signal beam S interfere with each other, to generate an interference pattern in a storage medium. Referring to FIG. 1B, when reproducing data, the original reference beam R is applied to holograms stored in the storage medium, to generate the output signal beam S, by diffracting the recorded hologram.

Data is recorded on the holographic storage medium by an interference between the signal beam S and the reference beam R. The signal beam S is generated by a spatial light modulator (SLM). The signal beam S is in the form of a datapage that includes a plurality of pixels. The signal beam S passes through an optical system, and interferes with the reference beam R, to produce an interference pattern on the storage medium. The interference pattern, generated by an interference of the signal beam S and the reference beam R, is recorded in the storage medium. If the reference beam R is applied to the recorded interference pattern, the recorded signal beam S is reproduced by diffraction.

When recording the holograms, the intensity and phase of the signal beam S can be recorded by, for example, varying the angle of the reference beam R. Hundreds or even thousands of hologram datapages can be recorded in the same position. The datapage contains information in the form of pixels, in particular, when the pixels are turned on or off. The original data is modulated, by adjusting the number of on or off pixels in one binary datapage, while recording the data on the holographic storage medium.

FIGS. 2A-2C show examples of conventional modulation codes, that are used for producing holograms. The modulation code lowers the ratio of light to dark portions, by distributing light evenly, to reduce errors. In the modulation code, for example, "1" and "0" can be respectively expressed as "01" and "10". Alternatively, "1" and "0" can be respectively expressed as "10" and "01". Assuming that "1" is a case when light is allowed to pass through a pixel, and "0" is a case when light is blocked, if the data includes many 0's, power is not sufficiently supplied to the holograms, and recording is not performed efficiently. If the data includes too many 1's, a signal produced therefrom may be degraded. The modulation code is used to prevent this problem and to improve signal quality. Data before modulation is referred to as a dataword. A dataword is referred to as a codeword, after being modulated by a modulation code.

Referring to FIGS. 2A through 2C, white portions are on-pixels and shaded portions are off-pixels. The on-pixels transmit incident rays and the off-pixels block incident rays. FIG. 2A shows a conventional 1:2 modulation code, which is a 2-bit modulation code for representing 1-bit data. In the 1:2 modulation code, 1-bit information of "0" or "1" can be indicated in accordance with the position of an on-pixel. One (1) on-pixel and one (1) off-pixel are included in the 1:2 modulation code, allowing two (2) permutations. Since $2^1=2$, 1-bit data can be represented by this modulation code. Therefore, the modulation code of FIG. 2A is a 1:2 modulation code.

FIG. 2B shows a conventional 2:4 modulation code, which can represent four ($_4C_1$) different 2-bit datawords, i.e., "00", "01", "10", and "11". Since $2^2=4$, a 4-bit modulation code is needed to represent 2-bit data. Therefore, the modulation code of FIG. 2B is a 2:4 modulation code.

FIG. 2C is a view of a conventional 3:9 modulation code. 3-bit datawords are modulated to 9-bit codewords. One pixel out of nine pixels is the on-pixel, giving nine (9) permutations. Since 9 is a number between $2^3$ and $2^4$, all 3-bit datawords can be represented, but not all 4-bit datawords can be represented. Accordingly, $2^3=8$ different datawords can be represented by 3-bit codewords, using the 3:9 modulation code.

When a lens is used to record and reproduce data in holography, different parts of the lens have different field characteristics. In general, field characteristics, such as the modulation transfer function (MTF), are high in the center of the lens and lower towards the edges of the lens. The MTF is a variation of the spatial frequency characteristics of a signal and is an indication of the characteristics and performance of a lens. When field characteristics, such as the MTF, deteriorate, the signal quality of a datapage is reduced. For example, the signal quality can be reduced in signals traveling through the edges of a lens. Furthermore, in the modulation code used for the holograms, the quality of a reproduction signal, such as bit error rate (BER), is improved as the number of on-pixels is decreased. However, if the on-pixel rate is fixed, the signal characteristics of the datapage data vary in accordance with the position of the lens. Therefore, signals of consistent quality cannot be recorded or reproduced.

SUMMARY OF THE INVENTION

Several aspects and example embodiments of the present invention provide a holographic storage medium, and a method and an apparatus for recording/reproducing data on/from the holographic storage medium, in order to maintain a constant reproduction quality of a datapage signal. Additional aspects and/or advantages of the invention will be set forth in part in the description which follows and, in part, will be obvious from the description, or may be learned by practice of the invention.

Disclosure with an example embodiment of the present invention, there is provided a method of recording data on a holographic storage medium, in which holograms are recorded in datapages. The method includes dividing a datapage into a plurality of regions; and recording the data by arranging codewords, having different on-pixel rates, in the respective regions.

According to an aspect of the present invention, the regions may be divided in accordance with the quality of a reproduction signal produced in the different regions. The recording of the data can be accomplished by modulating the data into codewords having different on-pixel rates and arranging the codewords in the regions. The arranging of the codewords is performed by arranging codewords having high on-pixel rates in regions having a high quality reproduction signal and arranging codewords having low on-pixel rates in regions having a low quality reproduction signal.

According to an aspect of the present invention, the data may be modulated into codewords using the same modulation code. According to an aspect of the present invention, the codewords may be a plurality of sub-blocks, which constitute a datablock, and are modulated using the same modulation code. According to an aspect of the present invention, the data may be modulated into codewords using different modulation codes. According to an aspect of the present invention, the regions having a high quality reproduction signal may be disposed in central regions of the datapage, and the regions having a low quality reproduction signal may be disposed in edge regions of the datapage.

In accordance with another example embodiment of the present invention, there is provided an apparatus, for recording data on a holographic storage medium, in which holograms are recorded in datapages. The apparatus includes a light processing unit, which records the data on the holographic storage medium, using a signal beam and a reference beam; and a control unit, which divides a datapage into a plurality of regions and controls the light processing unit, so as to record the data by arranging codewords, having different on-pixel rates, in the respective regions.

According to an aspect of the present invention, the regions may be divided in accordance with the quality of a reproduction signal produced thereby. The control unit may divide the datapage in accordance with the quality of a reproduction signal produced in the various regions of the datapage. The control unit can modulate the data of the datapage into codewords. The control unit can control the light processing unit, to record the data by arranging codewords having high on-pixel rates in regions having a high quality reproduction signal and by arranging codewords having low on-pixel rates in regions having a low quality reproduction signal.

According to an aspect of the present invention, the data may be modulated into codewords using a single modulation code. According to an aspect of the present invention, the codewords may be a plurality of sub-blocks, which constitute a datablock, and the sub-blocks can be modulated using the same modulation code. According to an aspect of the present invention, the data may be modulated into codewords using different modulation codes.

According to an aspect of the present invention, the regions having a high quality reproduction signal may be central regions of the datapage, and the regions having a low quality reproduction signal may be edge regions of the datapage.

In accordance with another example embodiment of the present invention, there is provided a method of reproducing data from a holographic storage medium, in which holograms are recorded in datapages. The method includes: reading a datapage from the holographic storage medium; and dividing the datapage, to be demodulated from codewords, into regions, based on different on-pixel rates.

According to an aspect of the present invention, the dividing of the regions to be demodulated from the codewords may include dividing the datapage into the regions, in accordance with the signal quality of a reproduction signal of the datapage, and using demodulation codes, corresponding to the modulation codes used when the codewords were modulated, to demodulate the codewords into data. According to an aspect of the present invention, the data may be modulated into codewords using the same modulation code. According to an aspect of the present invention, the codewords may be a plurality of sub-blocks, which constitute a datablock, and can be modulated using the same modulation code.

According to an aspect of the present invention, the data may be modulated into codewords using different modulation codes. According to an aspect of the present invention, the regions having a high quality reproduction signal may be disposed in central regions of the datapage, and the regions having a low quality reproduction signal may be disposed in edge regions of the datapage.

According to another aspect of the present invention, there is provided an apparatus for reproducing data from a holographic storage medium having holograms are recorded in datapages. The apparatus includes: a light processing unit, which reads a datapage from the holographic storage medium; and a control unit, which controls the division of the datapage into regions having different on-pixel rates. According to an aspect of the present invention, the control unit may control the division of the regions in accordance with the signal quality of a reproduction signal produced in various regions of the datapage. The codewords can be demodulated using demodulation codes corresponding to modulation codes used to modulate the codewords.

According to an aspect of the present invention, the data may be modulated into codewords using the same modulation code. According to an aspect of the present invention, the codewords may be a plurality of sub-blocks, which constitute a datablock, and can be modulated using a single modulation code. According to an aspect of the present invention, the data may be modulated into codewords using different modulation codes. According to an aspect of the present invention, the regions having a high quality reproduction signal may be disposed in central regions of the datapage and the regions having a low quality reproduction signal may be disposed in edge regions of the datapage.

According to another aspect of the present invention, there is provided a holographic storage medium, in which holograms are recorded in datapages, wherein the datapages are divided into a plurality of regions. Data is recorded in the regions by arranging codewords having different on-pixel rates in the different regions. According to an aspect of the present invention, the regions may be divided in accordance with the quality of a reproduction signal produced therein. The data may be recorded by arranging the codewords having high on-pixel rates in regions having a high quality reproduction signal and by arranging the codewords having low on-pixel rates in regions having a low quality reproduction signal.

According to an aspect of the present invention, the data may be modulated into codewords using the same modulation code. According to an aspect of the present invention, the codewords may be a plurality of sub-blocks which constitute a datablock and are modulated using the same modulation code. According to an aspect of the present invention, the data may be modulated into codewords, using different modulation codes. According to an aspect of the present invention, the regions having a high quality reproduction signal may be central regions of the datapage, and the regions having a low quality reproduction signal may be edge regions of the datapage.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1A:
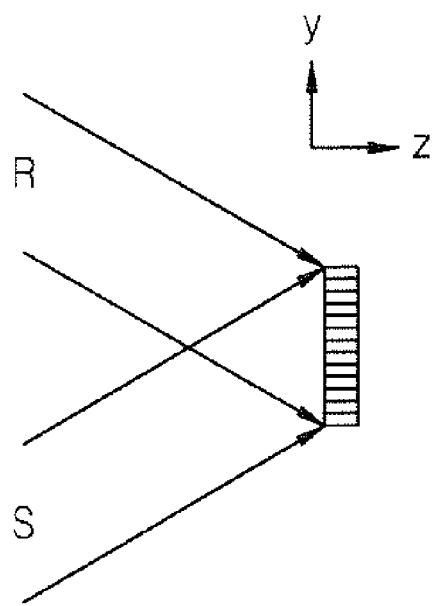
FIGS. 1A and 1B describe the recording and reproducing of data in optical holography.
Figure 1B:
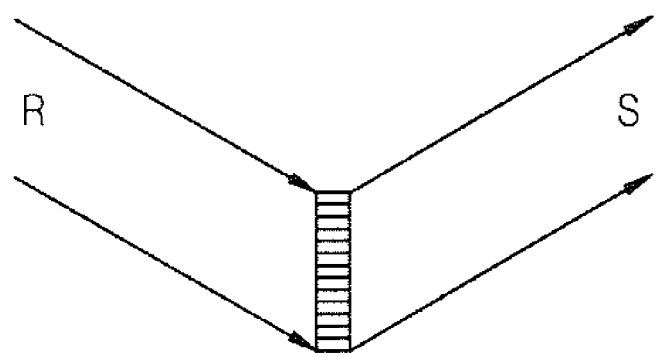

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
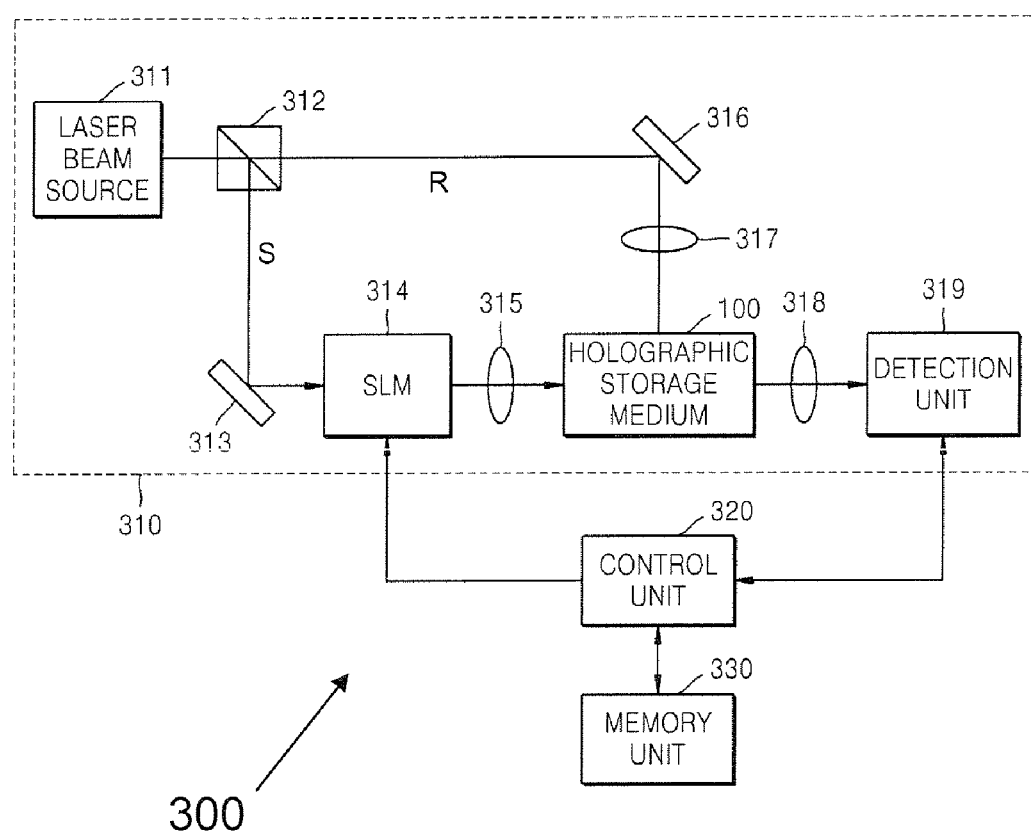
FIG. 3 is a diagram of an apparatus for recording/reproducing holograms, according to aspects of an embodiment of the present invention.

FIG. 3 is a diagram of an apparatus 300 for recording/reproducing holograms, according to an example embodiment of the present invention. As shown in FIG. 3, the apparatus 300 includes a light processing unit 310, a control unit 320, and a memory unit 330. A holographic storage medium 100 is inserted into the light processing unit 310. The control unit 320 controls the light processing unit 310, so as to record data on the holographic storage medium 100 or to reproduce the data from the holographic storage medium 100. The memory unit 330 temporarily stores data read from the holographic storage medium 100 or data to be recorded on the holographic storage medium 100. The light processing unit 310 includes a laser beam source 311, a beam splitter 312, a first mirror 313, a spatial light modulator (SLM) 314, a first lens 315, a second mirror 316, a second lens 317, a third lens 318, and a detection unit 319.

The control unit 320 controls the light processing unit 310, generates datapages containing the data, transmits the datapages to the light processing unit 310, and processes signals reproduced by the light processing unit 310. In particular, the control unit 320 divides each of the datapages, recorded on the holographic storage medium 100, into a plurality of regions, in accordance with the quality of a reproduction signal. The control unit 320 also controls the light processing unit 310, such that the data is recorded by arranging codewords, having different on-pixel rates, in different regions of the datapages.

The control unit 320 controls the arrangement of the codewords because the quality of the reproduction signal drops from the central regions to the edge regions of the datapages, thereby improving the signal quality of the data as the on-pixel rate decreases. Thus, the data is recorded by arranging the codewords having high on-pixel rates in the regions having a high quality reproduction signal, and arranging the codewords having low on-pixel rates in the regions having a low quality reproduction signal. This makes optimum use of the available reproduction signal quality, in every region of the datapages. As used herein, high and low on-pixel rates can refer to on-pixel rates that are relatively higher and lower.

After the datapages are divided into the regions having the high quality reproduction signal and the regions having the low quality reproduction signal, the codewords can be arranged in the regions by varying the on-pixel rate, by using the same modulation code or by using different modulation codes. As used herein, high and low quality reproduction signals can refer to reproduction signals that are relatively higher and lower in quality. Example embodiments of different modulation codes will be described later, with reference to FIG. 5 and FIGS. 6A-6B.

When data is recorded on the holographic storage medium 100, a laser beam is output from the laser beam source 311, and then divided by the beam splitter 312, into a reference beam R and a signal beam S. The signal beam S is incident on the SLM 314, via the first mirror 313, which displays the recorded data, and spatially amplitude-modulates the incident beam. The modulated signal beam is focused onto the holographic storage medium 100, via the first lens 315. Meanwhile, the reference light R is reflected via the second mirror 316 and directed onto the holographic storage medium 100, via the second lens 317. Accordingly, the superimposed signal beam S and reference beam R form an interference pattern, which is recorded as a precise pattern on the holographic storage medium 100.

When the data, recorded on the holographic storage medium 100, is reproduced from the holographic storage medium 100, a light beam, which is identical to the reference beam R that was used for recording, is applied to the holographic storage medium 100, and the data is reproduced as a diffraction beam. The diffraction beam corresponds to the interference pattern recorded on the holographic storage medium 100. The diffraction beam is focused onto the detection unit 319 via the third lens 318. The detection unit 319 can be a charge-coupled device (CCD) or a complementary metal-oxide-semiconductor (CMOS). The reproduction signal, output from the detection unit 319, is transferred to the control unit 320.

The light processing unit 310 reads the datapage from the holographic storage medium 100, and the control unit 320 controls the division of datapage into regions, in accordance with the quality of the reproduction signal produced by the various regions of the datapage. The control unit 320 controls the demodulation of the codewords, using demodulation codes corresponding to the modulation codes used to modulate the data into codewords. The codewords can be modulated using the same modulation code or different modulation codes.

Figure 2A:
FIGS. 2A through 2C show examples of a conventional modulation code used for holograms.
Figure 2B:
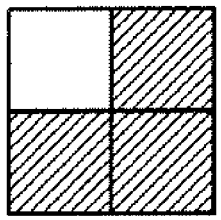
Figure 2C:
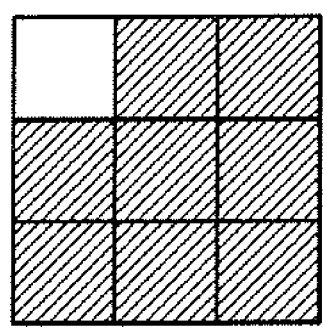
Figure 4:
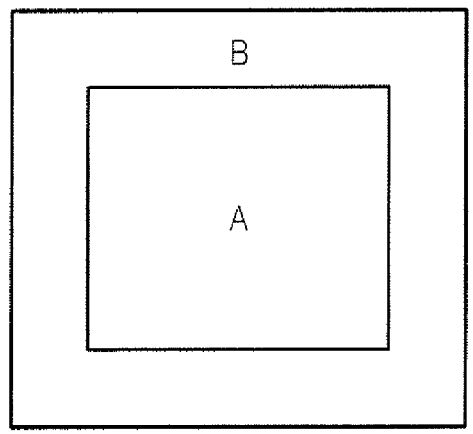
FIG. 4 shows a datapage, according to an example embodiment of the present invention.

FIG. 4 shows a datapage according to an example embodiment of the present invention. The control unit 320, shown in FIG. 2, divides the datapage into a plurality of regions, in accordance with the quality of a reproduction signal produced in the various regions. The datapage is divided into two regions: a central region A, having a high quality reproduction signal, and an edge region B, having a low quality reproduction signal as shown in FIG. 4. Codewords having high or low on-pixel rates are arranged in the regions having high or low quality reproduction signals, when recording data. For example, codewords having higher on-pixel rates can be recorded in the central region A, which has a higher quality reproduction signal, and codewords having lower on-pixel rates can be recorded in the edge region B, which has a lower quality reproduction signal.

Figure 5:
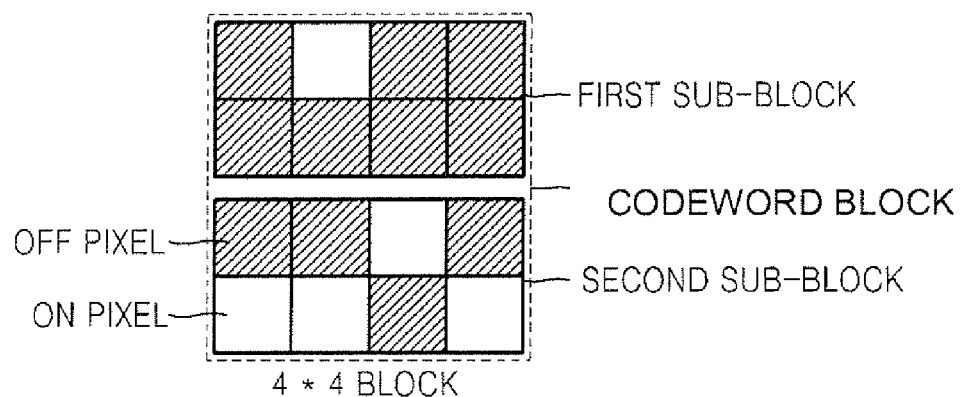
FIG. 5 shows a modulation code, according to an example embodiment of the present invention.

FIG. 5 shows data modulated by a modulation code to produce a codeword block, according to an example embodiment of the present invention. A codeword block, modulated by one modulation code, is divided into two sub-blocks having different on-pixel rates. The control unit 320 records the data by arranging the sub-blocks in the appropriate regions of the datapage. Accordingly, the regions, divided in accordance with the signal quality, are composed of codewords modulated by the same modulation code, but have the different on-pixel rates.

As shown in FIG. 5, an example codeword block is used, when a 9-bit dataword is represented by a 16-bit (4×4) modulation codeword having five (5) on-pixels. First, the 16-bit modulation codeword block is divided into two (2) 4×2 sub-blocks i.e., a first sub-block and a second sub-block. The first sub-block includes one (1) on-pixel, and the second sub-block includes four (4) on-pixels. The first sub-block can have $8C_1$, that is, eight (8) different permutations. The first sub-block can be used to record $2^3$ different instances, by varying the position of the on-pixel, thereby representing 3-bit data. The second sub-block can have $8C_4$, that is, seventy different permutations. The second sub-block can be used to record $2^6$, that is, sixty four (64) different instances, by varying the positions of the on-pixels, thereby representing 6-bit data. The first sub-block is arranged in region B of FIG. 4, where the signal quality is low, and the second sub-block is arranged in region A of FIG. 4, where the signal quality is high.

Figure 6A:
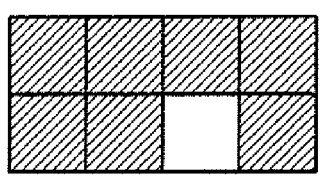
FIGS. 6A-6B show modulation codes, according to another example embodiment of the present invention.
Figure 6B:
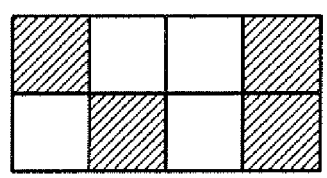

FIG. 6A and FIG. 6B show data modulated by modulation codes, according to another example embodiment of the present invention. Modulation codes used in FIGS. 6A-6B produce codeword blocks where data is modulated using two modulation codewords, each having a different on-pixel rate. That is, the data in the respective regions is modulated using the different modulation codes, and thus, has different on-pixel rates.

Referring to FIGS. 6A-6B, one of the modulation codes used is a 3:8 modulation code having one on-pixel, and the other is a 6:8 modulation code having four on-pixels. The regions are divided in accordance with the signal quality, and are composed of codewords modulated using the different modulation codes. The 6:8 modulated codeword is disposed in region A of FIG. 4, where the signal quality is high, and the 3:8 modulated codeword is disposed in region B of FIG. 4, where the signal quality is low. Thus, a datapage is divided into regions, before modulating the data, and the data of each region is modulated using a different modulation code.

In the example embodiment of FIG. 5, one modulation code is used for the whole datapage, and the sub-blocks are arranged into the regions according to their on-pixel rates, whereas in the example embodiments of FIG. 6A-6B shows a datapage that is divided first, and the data for each region is modulated using different modulation codes.

In FIGS. 5, 6A, and 6B, the datapage is divided into two regions. However, the datapage may be divided into more regions. For example, the regions of the datapage may be divided in other ways, in addition to central and edge regions, in accordance with the quality of a reproduction signal produced therefrom.

Figure 7:
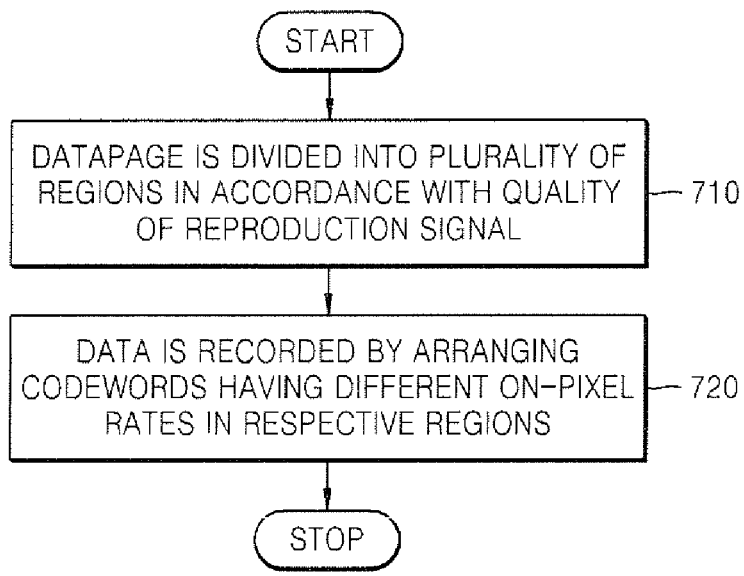
FIG. 7 is a flowchart of a method of recording data on a holographic storage medium, according to an example embodiment of the present invention.

FIG. 7 is a flowchart of a method of recording data on a holographic storage medium, according to an example embodiment of the present invention. As shown in FIG. 7, a datapage is divided into a plurality of regions, in accordance with the quality of a reproduction signal, in operation 710. In general, the datapage can be divided based on the fact that the quality of the reproduction signal drops from a central region to an edge region of the datapage.

In operation 720, the data is recorded by arranging codewords having different on-pixel rates in the appropriate regions. Since the quality of the reproduction signal improves as the number of on-pixels increases, codewords having low on-pixel rates are placed in the regions having a low quality reproduction signal. The codewords having high on-pixel rates are placed in the regions having a high quality reproduction signal. The codewords can be assigned to each region of the datapage, according to the on-pixel rate, after being modulated by the same modulation code. Alternatively, the modulated codewords can be assigned to each region of the datapage after being modulating by different modulation codes, for each region.

Figure 8:
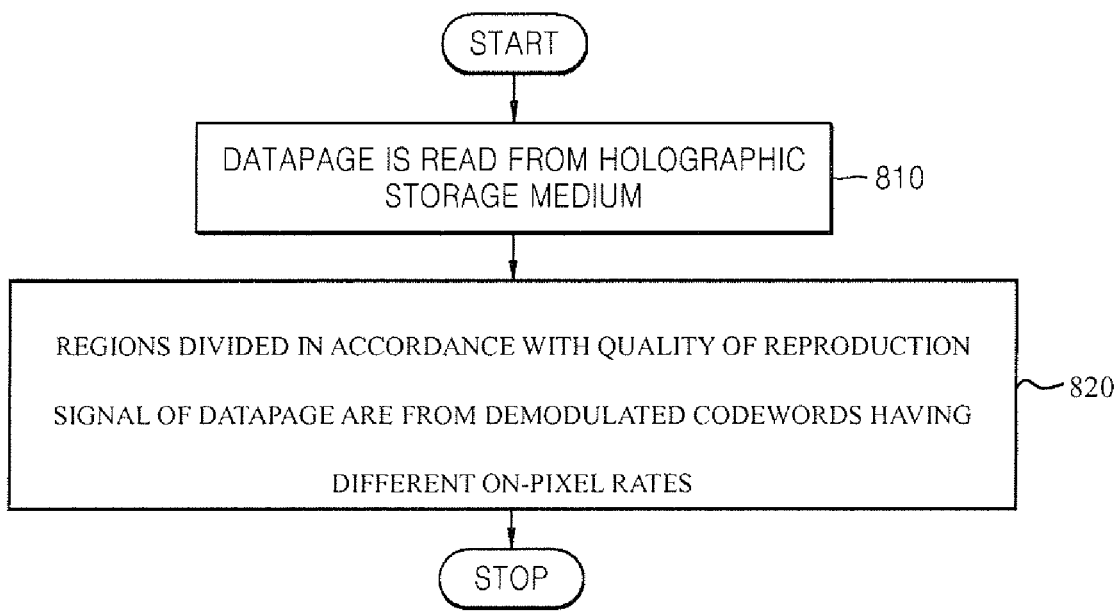
FIG. 8 is a flowchart of a method of reproducing data from a holographic storage medium, according to an example embodiment of the present invention.

FIG. 8 is a flowchart of a method of reproducing data from a holographic storage medium, according to an example embodiment of the present invention. As shown in FIG. 8, a datapage is read from a holographic storage medium, in which holograms are recorded in datapages in operation 810.

In operation 820, the datapage is divided into regions, in accordance with the quality of a reproduction signal produced from the different regions. The datapage is demodulated from codewords having different on-pixel rates.

When the codewords are modulated using different modulation codes, for different regions of the datapage, the codewords are demodulated using demodulation codes that correspond to the modulation codes. Since the regions of the datapage are divided in accordance with the reproduction signal quality, the codewords are demodulated using demodulation codes corresponding to the modulation codes used when the data was modulated. For example, the data is reproduced by demodulating a 16-bit codeword to a 9-bit codeword.

When the codewords are modulated, using different modulation codes for the different regions of the datapage, the codewords are demodulated using demodulation codes corresponding to the modulation codes of the respective regions. However, when the data is recorded by arranging sub-blocks, having different on-pixel rates on the datapage, after modulating the data using the same modulation code, the datapage is rearranged into blocks and then demodulated using the demodulation code corresponding to the modulation code.

According to an example embodiment of the present invention, the data can also be recorded by arranging codewords having different on-pixel rates, in adjacent datapages. In addition, one datapage can be divided into a plurality of regions, since adjacent datapages may also have different signal qualities. When one datapage is divided into a plurality of regions, one of the regions can be a management information region that has a higher signal quality. Another region can be a user region that has a standard signal quality. If a datapage is divided into the management information region and the user region, the codewords having low on-pixel rates are arranged in the management information region, and the codewords having high on-pixel rates are arranged in the user region, to control the quality of the reproduction signal.

As described above, the quality of a reproduction signal of a datapage can be maintained. The signal quality of every portion of the datapage can be improved, by recording data using modulation codes having different on-pixel rates, in accordance with the quality of the reproduction signal.

The example embodiments of the present invention can be written as computer programs and can be stored in a computer readable medium. The programs can be implemented in general-use digital computers, using the computer readable recording medium. Examples of the computer readable mediums include magnetic storage media (e.g. ROM, floppy disks, hard disks, etc.), optical recording media (e.g. CD-ROMs, or DVDs), and storage media such as carrier waves (e.g. transmission through the Internet).

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A method of recording data on a holographic storage medium as holograms recorded in datapages, the method comprising:
   dividing a datapage into a plurality of regions;
   recording the data by modulating the data into codewords having different on-pixel rates; and
   arranging the codewords in the plurality of regions of the datapage based on the different on-pixel rates,
   wherein:
      the datapage is divided into a plurality of regions in accordance with the quality of a reproduction signal produced in different portions of the datapage, and
      the data is recorded by:
         arranging the codewords having higher on-pixel rates in regions of the datapage that produce a higher quality reproduction signal, and
         arranging codewords having lower on-pixel rates in regions of the datapage that produce a lower quality reproduction signal.

2. The method of claim 1, wherein the data is modulated into codewords using a single modulation code.

3. The method of claim 2, wherein:
   the codewords comprise a plurality of sub-blocks that constitute a codeword block; and
   the sub-blocks are modulated using the modulation code.

4. The method of claim 1, wherein the data is modulated into codewords using a plurality of modulation codes.

5. The method of claim 1, wherein:
   the regions that produce a higher quality reproduction signal are central regions of the datapage; and
   the regions that produce a lower quality reproduction signal are edge regions of the datapage.

6. An apparatus for recording data on a holographic storage medium as holograms recorded in datapages, the apparatus comprising:
   a light processing unit configured to record the data on the holographic storage medium using a signal beam and a reference beam; and
   a control unit configured to:
      divide a datapage into a plurality of regions;
      modulate the data into codewords having different on-pixel rates; and
      control the light processing unit so as to record the data by arranging the codewords in the plurality of regions based on the on-pixel rates,
   wherein the control unit is further configured to:
      divide the datapage into regions in accordance with the quality of a reproduction signal produced therein, and
      control the light processing unit so as to record the data by:
         arranging the codewords having higher on-pixel rates in regions having a higher quality reproduction signal, and
         arranging the codewords having lower on-pixel rates in regions having a lower quality reproduction signal.

7. The apparatus of claim 6, wherein the data is modulated into codewords using a single modulation code.

8. The apparatus of claim 7, wherein:
   the codewords comprise a plurality of sub-blocks that constitute a codeword block; and
   the sub-blocks are configured to be modulated using the modulation code.

9. The apparatus of claim 6, wherein the data is modulated into codewords using a plurality of modulation codes.

10. The apparatus of claim 6, wherein the regions having the higher quality reproduction signal are disposed in central regions of the datapage and the regions having the lower quality reproduction signal are disposed in edge regions of the datapage.

11. A method of reproducing data from a holographic storage medium comprising holograms recorded as datapages, the method comprising:
   reading a datapage from the holographic storage medium; and
   demodulating codewords that are disposed in different regions of the datapage, the codewords comprising different on-pixel rates, the codewords being disposed in the different regions of the datapage based on the on-pixel rates,
   wherein:
      the datapage is divided into the different regions in accordance with the signal quality of reproduction signals from the different regions,
      the codewords having higher on-pixel rates are arranged in the regions having a higher quality reproduction signal, and
      the codewords having lower on-pixel rates are arranged in the regions having a lower quality reproduction signal.

12. The method of claim 11, wherein:
the demodulating of the codewords comprises using demodulation codes corresponding to modulation codes used to modulate data into the codewords.

13. The method of claim 12, wherein the data is modulated into codewords using a plurality of modulation codes.

14. The method of claim 12, wherein:
the regions having a higher quality reproduction signal are disposed in central regions of the datapage; and
the regions having a lower quality reproduction signal are disposed in edge regions of the datapage.

15. The method of claim 12, wherein the data is modulated into codewords using a single modulation code.

16. The method of claim 15, wherein:
the codewords comprise a plurality of sub-blocks that constitute a codeword block; and
the sub-blocks are modulated using the modulation code.

17. An apparatus for reproducing data from a holographic storage medium comprising holograms recorded in datapages, the apparatus comprising:
a light processing unit configured to read a datapage from the storage medium; and
a control unit configured to demodulate codewords having different on-pixel rates, the codewords being disposed in different regions of the datapage based on the different on-pixel rates,
wherein,
the control unit is further configured to divide the datapage into the different regions in accordance with the signal quality of a reproduction signal produced in the different regions of the datapage,
the codewords having higher on-pixel rates are arranged in the regions having a higher quality reproduction signal, and
the codewords having lower on-pixel rates are arranged in the regions having a lower quality reproduction signal.

18. The apparatus of claim 17, wherein the control unit is further configured to demodulate the codewords into data using demodulation codes corresponding to modulation codes used to modulate the data into the codewords.

19. The apparatus of claim 18, wherein the data is modulated into codewords using a single modulation code.

20. The apparatus of claim 19, wherein:
the codewords comprise a plurality of sub-blocks that constitute a codeword block; and
the sub-blocks are modulated using the modulation code.

21. The apparatus of claim 18, wherein the data is modulated into codewords using a plurality of modulation codes.

22. The apparatus of claim 18, wherein the different regions comprise:
regions configured to produce a higher quality reproduction signal and that are disposed at central regions of the datapage; and
regions configured to produce a lower quality reproduction signal and that are disposed at edge regions of the datapage.

23. A holographic storage medium to store data, comprising:
holograms recorded in datapages, the datapages being divided into a plurality of regions, the data modulated into codewords comprising different on-pixel rates, the codewords being arranged in the plurality of regions based on the different on-pixel rates,
wherein:
each datapage is divided into the plurality of regions in accordance with the quality of a reproduction signal created therein,
the codewords having higher on-pixel rates are arranged in the regions having a higher quality reproduction signal, and
the codewords having lower on-pixel rates are arranged in the regions having a lower quality reproduction signal.

24. The holographic storage medium of claim 23, wherein the data is modulated into codewords using a single modulation code.

25. The holographic storage medium of claim 24, wherein:
the codewords comprise a plurality of sub-blocks that constitute a codeword block; and
the sub-blocks are modulated using the modulation code.

26. The holographic storage medium of claim 23, wherein the data is modulated into codewords using a plurality of modulation codes.

27. The holographic storage medium of claim 23, wherein:
the regions having the higher quality reproduction signal are disposed in central regions of the datapage; and
the regions having the lower quality reproduction signal are disposed in edge regions of the datapage.

* * * * *